Feb. 7, 1939.  J. LUNDGREN  2,146,547
FLEXIBLE DRIVING CONNECTION FOR BALANCING MACHINES
Filed Dec. 1, 1937
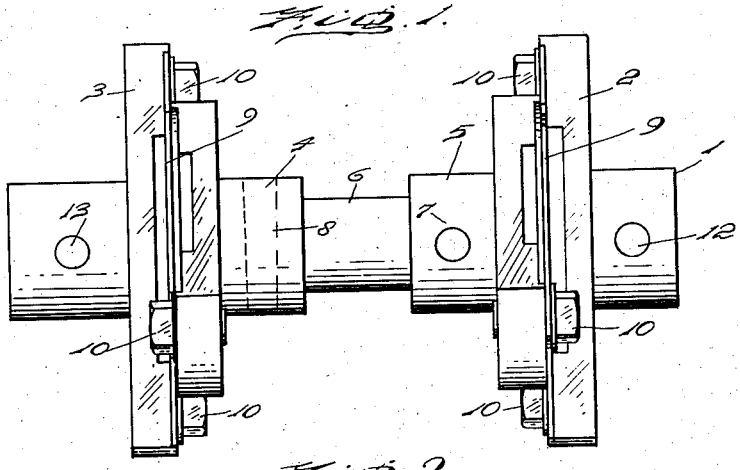
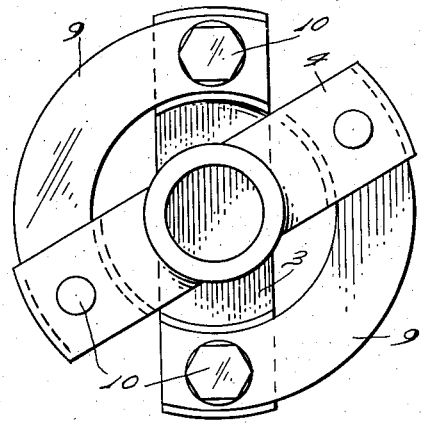
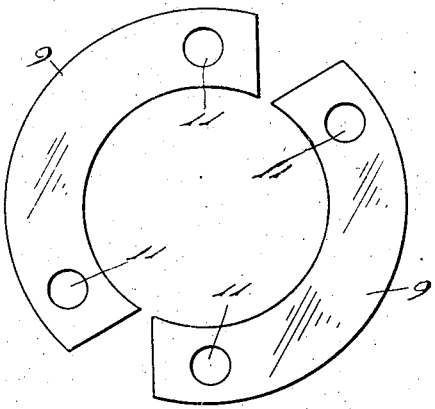
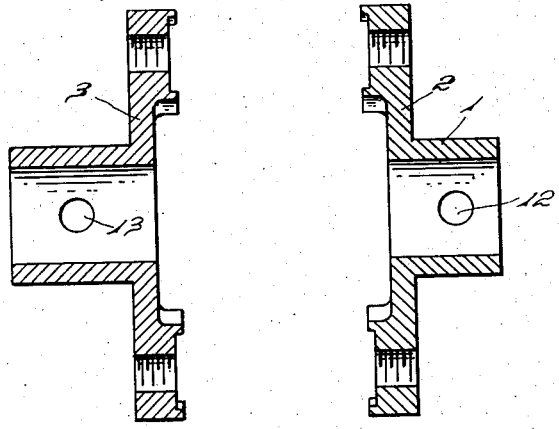
INVENTOR
Jacob Lundgren
BY
Herbert S. Fairbanks
ATTORNEY Patented Feb. 7, 1939

2,146,547

UNITED STATES PATENT OFFICE 2,146,547

FLEXIBLE DRIVING CONNECTION FOR BALANCING MACHINES

Jacob Lundgren, Philadelphia, Pa., assignor to Tinius Olsen Testing Machine Company, Philadelphia, Pa., a corporation of Pennsylvania Application December 1, 1937, Serial No. 177,626

2 Claims. (Cl. 64—15)

The object of this invention is to devise a novel flexible driving connection in which friction is eliminated and wherein the driving connection will be flexible longitudinally without affecting the torque.

With the above and other objects in view, as will hereinafter appear, my invention comprehends a novel driving connection, which, although especially designed to be advantageously employed between an electric motor and the revoluble body under test in the balancing machine, can be employed for other purposes, if desired.

Other novel features of construction and advantage will hereinafter more clearly appear in the detailed description and the appended claims.

For the purpose of illustrating the invention, I have shown in the accompanying drawing a typical embodiment of it, which, in practice, will give satisfactory and reliable results. It is, however, to be understood that the various instrumentalities of which my invention consists can be variously arranged and organized and my invention is not limited to the exact arrangement and organization of these instrumentalities as herein set forth.

Figure 1 is a side elevation of a flexible driving connection for balancing machines, embodying my invention.

Figure 2 is an end elevation of one of the driving units.

Figure 3 is a plan view of the springs.

Figure 4 is a sectional view of a lower end fork.

Figure 5 is a sectional view of an upper end fork.

Similar numerals indicate corresponding parts.

Referring to the drawing:—

1 designates a flexible driving connection for balancing machines, embodying my invention.

2 designates an upper fork and 3 a lower fork which is of the same construction as the upper fork except that the hub of the lower fork is preferably longer than the hub of the upper fork. 4 and 5 are intermediate forks of the same construction as the fork 2. Each fork has a hub and a fork forming arm. The hubs 4 and 5 are adapted to receive a driving rod 6 secured therein by pins 7 and 8. 9 designates flat driving springs connected with adjacent forks by fastening devices 10 such as for example bolts, the springs having holes 11 near their ends to receive the bolts, which latter are threaded to screw into the forks. The holes in a spring are preferably spaced more than 90° apart. The hub of the fork 1 has a pin receiving opening 12, and the hub of the fork 2 has a pin receiving opening 13 so that they can be coupled to a driving member and to the part to be driven.

My present invention is adapted to be employed where a flexible drive is employed, and can be advantageously employed with an electric motor.

While for convenience of description I have referred to an upper and a lower fork, it is to be understood that the direction of the drive is immaterial as the flexible driving connection can be used in a vertical, horizontal, or any other desired position.

The springs are in the form of flat segments which are normally disposed in planes at right angles to the axis of rotation.

The flexible connection is especially adapted to be employed as a driving connection between the drive shaft of a balancing machine and the revoluble body which is to be tested since friction has been eliminated and the driving connection is flexible longitudinally without affecting the torque.

It will now be apparent that I have devised a new and useful flexible driving connection for balancing machines, which embodies the features of advantage enumerated as desirable in the statement of the invention and the above description, and while I have, in the present instance, shown and described a preferred embodiment thereof, which will give in practice satisfactory and reliable results, it is to be understood that this embodiment is susceptible of modification in various particulars without departing from the spirit or scope of the invention or sacrificing any of its advantages.

Having thus described my invention, what I claim as new and desire to secure by Letters Patent is:—

1. A flexible driving unit consisting of a driving and driven member, each consisting of a hub and a fork, with grooves at the ends of the forks, and segmental flat springs of uniform width throughout their length, each spring having one end rigidly secured in the groove of a driving fork and its opposite end rigidly secured in the groove of a driven fork, thereby maintaining accurate alignment of the unit.

2. A flexible driving unit consisting of a driving and driven member, each consisting of a hub and a fork, with grooves at the ends of the forks, and segmental flat springs of uniform width throughout their length, each spring having one end rigidly secured in the groove of a driving fork and its opposite end rigidly secured in the groove of a driven fork, thereby maintaining accurate alignment of the unit and the points of attachment at the ends of a spring being greater than ninety degrees.

JACOB LUNDGREN.